Jan. 1, 1963 N. C. CHRISTOFILOS 3,071,525
METHOD AND APPARATUS FOR PRODUCING THERMONUCLEAR REACTIONS
Filed Aug. 19, 1958 4 Sheets-Sheet 1

INVENTOR.
NICHOLAS C. CHRISTOFOLIS
BY
Roland A. Anderson
ATTORNEY.

Jan. 1, 1963    N. C. CHRISTOFILOS    3,071,525
METHOD AND APPARATUS FOR PRODUCING THERMONUCLEAR REACTIONS
Filed Aug. 19, 1958    4 Sheets-Sheet 2

INVENTOR.
NICHOLAS C. CHRISTOFOLIS
BY
ATTORNEY

INVENTOR.
NICHOLAS C. CHRISTOFOLIS
BY
Roland C. Anderson
ATTORNEY.

Jan. 1, 1963 N. C. CHRISTOFILOS 3,071,525
METHOD AND APPARATUS FOR PRODUCING THERMONUCLEAR REACTIONS
Filed Aug. 19, 1958 4 Sheets-Sheet 4

INVENTOR.
NICHOLAS C. CHRISTOFILOS
BY
ATTORNEY.

3,071,525
Patented Jan. 1, 1963

3,071,525
METHOD AND APPARATUS FOR PRODUCING THERMONUCLEAR REACTIONS
Nicholas C. Christofilos, 3151A Eton Ave., Berkeley, Calif.
Filed Aug. 19, 1958, Ser. No. 756,044
25 Claims. (Cl. 204—154.2)

This application is a continuation-in-part of my application "Method and Means to Generate Controllable Thermonuclear Reactions in Industrial Scale and Utilization of the Released Energy," Serial No. 337,994, filed February 20, 1953, now abandoned.

The present invention has for its goal the production of conrolled thermonuclear reactions and, more particularly, to methods and apparatus for producing such reactions wherein a layer of relativistic electrons rotating in a magnetic field is employed to effect necessary operations including ionization, heating, confinement, production and utilization of a thermonuclear reaction plasma.

Thermonuclear reactions occur between the ions of light elements, e.g., $H^+$ and $Li^+$ and especially certain isotopes thereof, e.g., $T^+$ and $D^+$, when present in a system in sufficient density and at a kinetic temperature of adequate magnitude in accordance with well understood principles. Generally speaking, thermonuclear conditions have been defined as the achievement of an adequately confined plasma having a temperature and density sufficiently high to produce a significant release of energy from fusion reactions. However, in order to provide a self-sustaining fusion-reaction, the temperature must exceed the ideal ignition temperature which ranges from 5 to 40 kev. for various isotopes of the light elements. The ideal ignition temperature as employed herein is defined as the temperature at which the thermonuclear energy yield released into the plasma is equal to the bremsstrahlung and other plasma losses. Moreover, it is contemplated that excess energy in amounts suitable for external utilization corresponding to usual industrial scale may be obtained by producing and confining a plasma comprising hydrogen isotopes or mixtures thereof having densities in the range of $10^{14}$ to a few times $10^{15}$ ions per cc. at kinetic temperatures in the range of about 10 to 100 kev. or even greater (1 kev.$=11.6\times10^{3\circ}$ K.). Plasmas of the latter category should provide power outputs per unit of volume of manageable magnitude wherefore an apparatus of economical design and which may be constructed in accordance with usual engineering design. Under the conditions indicated a pressure of the order of about 100 kg./sq. cm. is required which pressure must be supplied by some means such as a magnetic field, acting on the thermonuclear reaction plasma since solid material walls are not suitable.

In accordance with my invention a thermonuclear reaction of the character described is produced in an evacuated vessel in which there is first established an elongated generally axially symmetric magnetic field. Relativistic electrons accelerated to a velocity at which their mass is several times the rest mass, i.e., above several mev., are injected into such field to form a rotating layer or sheath, hereinafter termed E-layer, which encloses an elongated cylindrical volume within said vessel. Thereafter, a thermonuclear fuel material is introduced into said vessel being therein ionized, trapped, heated or otherwise manipulated by forces generated by the E-layer acting in conjunction with said magnetic field and the resultant magnetic and electric fields to provide a thermonuclear reaction plasma confined under the density, pressure and temperature conditions whereat a controlled thermonuclear reaction is initiated and proceeds with the coincident production of significant quantities of energetic particles, radiant energy, heat and other products emergent therefrom, which products are thereafter employed for various utilitarian applications. The invention is particularly adapted to the production of controlled thermonuclear reactions on the large scale required in industrial applications such as the production of electrical power. Controlled thermonuclear reactors employing the foregoing method of producing and confining a thermonuclear reaction plasma have come to be known by the generic term "Astron thermonuclear reactors."

Accordingly, it is an object of my invention to provide controlled thermonuclear reactors and reaction methods in which a layer of electrons of relativistic energies rotating in a magnetic field in an evacuated region are employed for the production, confinement and heating of a thermonuclear reaction plasma.

Another object of my invention is to provide controlled thermonuclear reactors and reaction methods in which relativistic electrons are injected into an axially symmetric magnetic field substantially parallel to the axis of symmetry in an evacuated space to form a rotating sheath of electrons therein whereby the electro-magnetic field of said layer in combination with said axially symmetric magnetic field creates an electromagnetic field pattern wherein plasma can be established and heated to ignition temperature by macroscopic and microscopic electrical interactions with relativistic electrons of said layer.

Other objects and advantages of the invention will become apparent by consideration of the following description taken in conjunction with the accompanying drawing of which.

In general, the present invention contemplates the production of a controlled thermonuclear reaction plasma in an evacuated vessel utilizing the electromagnetic field pattern produced by the interaction of the electromagnetic field of a rotating substantially cylindrical E-layer or sheath of high energy electrons with an elongated axially symmetric magnetic field. More particularly, the axially symmetric magnetic field is established at a low level as the initial operation and subsequently the energetic electrons are injected and trapped therein to form said E-layer 71 which is defined by the helical paths of the electrons rotating about the axis of symmetry of said field. As an increasing number of electrons is accumulated in said layer the magnetic field is progressively increased as required to maintain the radius of gyration of the electrons of the E-layer approximately constant and for other purposes noted hereinafter. Concurrently with the accumulation of electrons in the E-layer, the electron charge per unit length increases. Since the rotating charges constitute an electrical current, an associated magnetic field is created within the cylindrical volume enclosed by the E-layer while an electric field is also created between the surface of the layer and the wall of the vessel due to the charge of the electrons. Since the E-layer has a finite thickness an electric field also exists within the thickness of the layer. However, the volume enclosed by the layer itself is field-free at least in the regions remote from the end regions. Neutral molecules or atoms introduced anywhere within the evacuated vessel enter the E-layer and are ionized by the electrons of said layer at any time subsequent to formation thereof and the resultant ions are attracted and accelerated towards central regions of the enclosed volume whereas the detached electrons produced by ionization are accelerated towards the vessel walls. As fuel ions are accumulated or concentrated within the enclosed space a positive space charge develops therein and some electrons remain with the ions thereby forming a plasma. The positive space charge tends to displace the ions outward; however, as the E-layer is traversed by ions the electrostatic field established between the E-layer and the wall reflectively repels the ions inward. This reflection exerts a pressure on the E-layer which in turn is transferred to the external magnetic field and thence to the coil structrue producing the field. Due to the presence of positive ions which gradually diffuse into the E-layer, the negative charge thereof is gradually neutralized and the electrostatic field becomes correlatively smaller. Finally, if adequate time is allowed, the neutralization process proceeds to the point that the electrostatic forces on the electrons of the E-layer can be considered small relative to the magnetic forces. Furthermore, due to the presence of the ions as well as to introduced neutral gas atoms in the E-layer region, the relativistic electrons are scattered thus acquiring a radial component of momentum. Hence the layer can be considered to have a finite thickness, $\delta$, and that the electrons oscillate radially within the layer about an equilibrium orbit which is at a distance approximately $\delta/2$ from the external surface of the layer. As more electrons are injected the magnetic field within the enclosed volume is intensified since the intensity of this field is porportional to the current per unit length of the E-layer. The orientation of this magnetic field is in opposition to the externally applied field. Thus the net value of the magnetic field within the enclosed volume is continuously reduced as additional electrons are injected and injection of sufficient electrons reverses the direction of the magnetic field within the enclosed volume. To accomplish this result the number of electrons per cm. length of the layer must exceed a critical number $N_0$ where (1) $$N_0 > \gamma/r_e$$

where $\gamma = m/m_0$ the relativistic mass ratio of electrons ($\gamma \approx 2V$ where $V$ is the electron energy in mev.) and $r_e = 2.83 \cdot 10^{-13}$ cm. the classical electron radius. This relation expressed differently may be written (1a) $$q > V$$

where $q$ the charge per unit length of the layer and $V$ the electron energy are expressed in e.s.u. (electrostatic units). The value of the applied field must satisfy the equation (2) $$B_w = \frac{V+q}{r_i} \cos \delta \text{ (gauss)}$$

where $V$ and $q$ are expressed is e.s.u., $r_i$ is the desired radius in cm. of the E-layer and $\cos \delta$ is the ratio between the azimuthal and total momentum of the electrons in the E-layer.

The initial value of the external field at the moment the injection of the electrons is initiated can be found from Equation 2 by setting $q=0$.

The net value of the magnetic field within the enclosed volume is $$B_i = \frac{V-q}{r_i} \cos \delta$$

From Equation 3 it can be seen that the direction of $B_i$ is opposite to the direction of the external field when $q > V$. As soon as this condition is met, the magnetic flux within the enclosed volume is negative with respect to the magnetic flux outside the layer. Considering a cylinder of radius $r_0$ (where $r_0 > r_i$) so that the flux confined between the cylinders of radius $r_0$ and $r_i$ respectively is equal to the flux, $\Phi$, (where $\Phi = B_i \pi r_i^2$) within the volume enclosed by the E-layer, it becomes obvious that all of the magnetic field lines lying on the surface of the cylinder of radius $r_0$ are bent near the ends of the layer and return along the axis of symmetry. This a pattern of closed magnetic lines is created by the generation of the E-layer which pattern constitutes the magnetic element of the desired electromagnetic field pattern.

Figure 8:
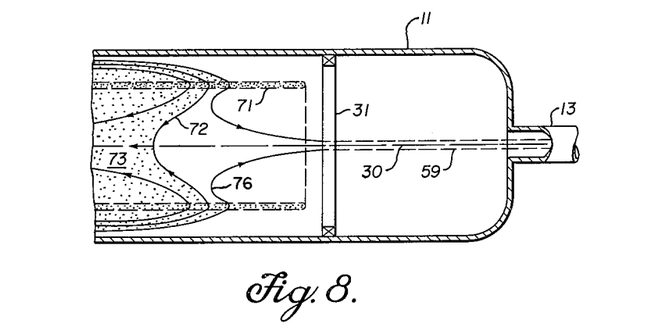
FIGURE 8 is a schematic illustration of an end portion of the reactor showing boundary configuration at an early stage of plasma formation.

These lines which return through the ends along the axis of symmetry are the outermost closed magnetic lines in this electromagnetic pattern. Thus the surface of revolution defined by these lines is referred to as the boundary of the electromagnetic field pattern. Lines located beyond this boundary are not closed within the evacuated region and are directed outward of this evacuated region in a direction generally parallel to the axis of symmetry. The intersection of this boundary surface with a plane through the axis of symmetry is referred to as the boundary line of said electromagnetic field pattern. This surface also constitutes the plasma boundary. In FIG. 8 the plasma boundary line 72 is shown at an early stage of the plasma formation and the plasma is confined in the volume 73. Since at this stage the contribution to the electromagnetic field pattern by the plasma current is negligible, the pattern at this stage is the result of the superposition of the magnetic field of the E-layer with the external magnetic field. Hence the shape of this pattern at this stage can be derived by elementary calculation of the magnetic field of a cylindrical current sheath, as represented by the E-layer, located within a substantially uniform magnetic field; where the direction of this uniform field is parallel to the axis of said cylindrical current sheath.

Particles which traverse the plasma boundary moving towards the exterior region where the magnetic field lines are open are directed outwardly from the ends of the vessel along the axis. Hence the boundary is effectively the last closed magnetic field line of the pattern. The electric element of the pattern is an electrostatic field which is normal to said magnetic field pattern. The electrostatic field therefore confines the plasma ions and the magnetic field the plasma electrons. Since it is fundamental that charged particles within a magnetic field can move freely along magnetic field lines but not at all across the lines, such motion across the lines can occur only by diffusion which results from Coulomb collisions between the particles in the presence of a pressure gradient across the field. The diffusion velocity of the ions across the lines is much greater than the corresponding diffusion velocity of the plasma electrons. Due to this circumstance the plasma becomts polarized and an electric field is established which tends to reduce the diffusion rate of the ions thereby tending to equalize the rate of diffusion of ions and electrons which electrons are linked to the magnetic field lines. Hence the rate of diffusion of the ions in the system is controlled by the rate of diffusion of the plasma electrons. Quantitative calculations of such electron diffusion rates are presented hereinafter.

Since the diffusive loss rate is a rather slow process the plasma density can be made to increase rapidly as soon as the closed magnetic lines pattern is created. Introduction of thermonuclear fuel gas atoms or molecules into the electromagnetic field pattern with resultant ionization by the electrons of the E-layer results in an increase of the plasma density. As the relativistic electrons move within this plasma, scattering Coulomb collisions (microscopic electrical interactions) occur with a resultant energy loss by the electrons and energy gain of the plasma electrons. The rate of energy loss of the E-layer electrons is given by the well-known Bethe formula $$(4) \qquad \frac{d\gamma}{dt} = -c 4_0 \pi r_e^2 \ln A$$

where $c$ is the light velocity, $n_0$ the density of the plasma electrons, $r_e$ the classical electron radius and $\ln A$ depends on the maximum to minimum interaction distance of the electrons depending on temperature and density of the plasma.

In the present case $\ln A \approx 20$. Hence $$(4a) \qquad \sigma_0 = 4\pi r_e \ln A \approx 2.10^{-23} \text{cm.}^2$$

wherein $\sigma_0$ is the mean Coulombic interaction cross section. This energy loss of the injected relativistic electrons is an energy gain for the plasma electrons which energy is in turn transferred by Coulomb collisions to the plasma ions. Plasma electrons which diffuse outward are considered lost as soon as they reach the last closed magnetic line. Hence at this boundary the plasma pressure is considered to be negligible. Since inwards from the boundary line, in the neighborhood of the E-layer, the plasma has a finite density and temperature and an associated finite pressure, a pressure gradient exists across the magnetic field lines. This gradient inherently generates a current, $j_0$, known as the Hall current given by the equation $$(5) \qquad \nabla p = \frac{j_0 \times B}{c}$$

The force $j_0 \times B/c$ balances the force created by the pressure gradient. The direction of this current is such that the generated magnetic field pattern of closed magnetic lines is intensified as the plasma pressure is being built up. Moreover, the electrostatic field which holds the ions also rises with the temperature. The value of this electric field is given approximately by the equation $$(6) \qquad E = U \cdot \frac{\nabla p}{p}$$

where $U$ is the plasma temperature. Both $E$ and $U$ are expressed in the same units. Thus we observe that the electromagnetic field pattern initially created by the electron layer is further intensified as the plasma builds up. Quantitative consideration of this effect is given hereinafter. These calculations will show that the energy delivered to the plasma by the scattering mechanism exceeds the diffusive and radiative energy loss. A correlative relation between the permitted plasma density and the required energy of the relativistic electrons of the E-layer in order to achieve the ignition or reaction temperature will also be disclosed hereinafter. Since the electrons of the E-layer lose energy by scattering the effective life-time in the E-layer is finite. Hence, the energetic electrons of the E-layer must be replaced continuously by injection from outside the system. After the ignition temperature is attained, thermonuclear fuel gas is injected in sufficient amounts to replace the expended fuel and continued energy release occurs by thermonuclear reactions thereafter in accordance with well-known thermonuclear reaction kinetics. The present method provides steady state operation whereby the plasma pressure, temperature and the intensity of the applied magnetic field may be maintained constant in time at any desired level. With steady state operation, the injection of the E-layer electrons requires an especially adapted procedure which is disclosed hereinafter. Basically, injection is effected by varying the magnetic field in the neighborhood of the injection area. Thus by employing a combination of standing and traveling magnetic waves new electrons are injected irreversibly into the E-layer and trapped therein while preventing the loss of electrons previously injected.

More specific details of the process will be set forth in the following description of apparatus adapted for operation in accordance with the invention.

Figure 6:
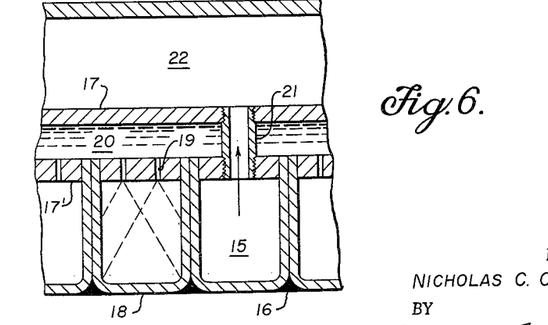
FIGURE 6 is an enlarged cross-section of the steam-generating elements constituting the inner-wall of the evacuated vessel.

The thermonuclear reactor 10 of the invention is constructed with an elongated cylindrical vessel 11 enclosing a space 12 and provided terminally with evacuation conduits 13 coupled to vacuum pump (not shown) and disposed in radiation shield 14. The cylindrical portion of vessel 11 is preferably constructed with a plurality of channel passages 15 extending longitudinally with abutting inner wall portions welded vacuum tight at 16 and bounded exteriorly by pressure shell 17 as shown in FIGURE 6. The surfaces 18 are heated by reaction products and accordingly pressurized water sprayed through conduits 19 from water manifold passage 20 against surfaces 18 in passages 15 is vaporized and the steam may be extracted through conduits 21 into manifold system 22 for utilization exteriorly.

The channels 15 must be formed of a material having good thermal conductivity and structural strength at high temperatures to withstand the high pressure of generated steam. The channels 15 are preferably U-shaped and are joined by welding or grazing to elements 17' forming the inner wall of the channel 20. Calculations show that with this arrangement a specific load of about 500 watts per square centimeter on the surface 18 can be tolerated.

An elongated segmented solenoid 23 is constructed of individual hollow conductors 25 encircling the vessel 11. These conductors 25 are of conventional construction for water cooling and are assembled in a manner similar to large industrial coils. The solenoid 23 is energized by a direct current to produce a substantially uniform magnetic field within the evacuated region with a direction substantially parallel to the axis of symmetry of the vessel 11 identified as a dashed line 30 in the drawings. This magnetic field is combined with the electromagnetic field of the E-layer 71 to form the electromagnetic field pattern described above for confining the plasma. Along the length of solenoid 23 the number of ampere turns per unit length are constant to provide said substantially uniform magnetic field. As it is desirable to extend the magnetic field uniformity substantially to the ends of the vessel 11, end coils 24 are disposed adjacent the ends of the solenoid 23. These end coils 24 are of similar construction to solenoid 23 except that same are formed with the number of ampere turns increasing progressively outwards along the axial direction. The segments of solenoid 23 and end coils 24 are electrically connected to form a single electrical path therethrough terminating at a pair of terminals 49' and 51'. As described above, the magnetic field is initially at a low level and is built up progressively during formation of the E-layer and plasma and is eventually maintained at a selected constant level in steady state operation; however, the rate of increase during buildup is very slow so that any accelerating effect of the associated electric field is negligible. The intensity, $B_0$, of this magnetic field produced by the excitation of solenoid 23 and end coils 24 is related to the ampere turns/cm., $i_0$, of the solenoid 23 by the relation:

$$(6a) \qquad B_0 = \frac{4\pi}{10} i_0 \text{ (gauss)}$$

Electron injection is herein accomplished as indicated above by the direction of high energy electron beams through magnetically shielded injection guide tubes 26 into a first trapping region defined between the median planes of a pair of coils 27 and 28. A second trapping region defined between the median planes of coil 28 and a third coil 29 receives electrons from the first trapping region. These coils are hereinafter termed trapping coils. The required high energy, high current pulsed electron beams may be generated by various known devices such as, for example, linear electron accelerators well within the knowledge of those skilled in the art. The injection coils are disposed with the first coil 27 adjacent to one of the ends of the vessel and the second coil 28 spaced therefrom along the axis 30 to define a first electron trapping region therebetween. The injection tubes 26 extend into the vessel 11 adjacent to the first injection coil 27 within the first trapping region and the tubes 26 are disposed so as to be directed tangentially to a cylindrical surface concentric with the vessel and having a radius $r_i$, where $r_i$ is the desirable radius of the E-layer. The tubes 26 are inclined to form an angle $\theta_i$ with a plane normal to the axis of symmetry. The injection coils are excited by a modulated direct current of a magnitude and phase angle specified hereinafter. For example, the current in these coils can be made to vary with time as $i = I_0(1 - \cos \omega t)$. A single direct current coil 31 is located at the opposite end of the vessel symmetrically to coil 29 to assist in reflecting electrons of the E-layer from the end region. Injection is initiated by actuating the accelerators when the current at coil 27 is zero and very small at coil 28. Owing to the inclination of the injection tubes 26 forming the angle $\theta_i$ with the axis of symmetry the injected electrons are caused to rotate in a helical path of radius $r_i$ within the magnetic field in the vessel. The electrons accordingly orbit away from the injector tubes along paths of radius $r_i$, pitch $d = 2\pi r_i \theta_i$ and acquire an axial velocity $v_z = c\theta_i$.

As the electron orbits move toward the plane of coil 28 the electrons are reflected by the radial magnetic field thereof. During this time the current in coil 27 is rising. The rate of rise of this current must be adequate so that the radial magnetic field thereof reflects the electrons as they return towards the injecting tube. The effect of the increasing current in coil 27 is that the injecting tubes are continuously moving uphill in the magnetic potential created in this injection region by the current applied to the coils 27 and 28. Hence, when the injected electrons return towards the injector after executing one betatron oscillation in this potential trough, they are prevented from hitting the injecting tubes 26. The radial field between the coils 27 and 28 (at the surface of radius $r_1$) is given approximately by the equation $$(7) \quad B_r = \frac{2i}{5h^2}(z - h)$$

and the field gradient by the equation $$(7a) \quad \frac{\partial B_r}{\partial z} = B' = \frac{2i}{5h^2}$$

where $i$ is the current in these coils, $z$ the distance parallel to the axis from the plane of coil 27 and $2h$ the distance between the planes of coils 27 and 28. Rotating electrons crossing the plane $z = h$ with an axial velocity $v_z = c\theta_i$ execute axial oscillations of amplitude $b$ where $b$ is given by the equation of betatron oscillations $$(8) \quad B'b^2 = \gamma \frac{m_0 c^2 \theta_i^2}{e}$$

The period of one oscillation is $$(8a) \quad t_0 = 2\pi \sqrt{\frac{m_0 \gamma}{eB'}}$$

From Equations 7a, 8 and 8a we obtain $$(9) \quad i = 2.5\gamma \frac{m_0 c^2}{e} \theta_i^2 \frac{h^2}{b^2}$$

$$(9a) \quad t_0^2 = 4\pi^2 \frac{b^2}{\theta_i^2 c^2}$$

Since the current in coil 27 varies as $(1 - \cos \omega t)$, this variation is parabolic in time as long as $i \ll I_a$; where $I_a$ is the corresponding maximum value.

Since the amplitude of the oscillations of the injected electrons is required to be less than a value $b_0$ in order to miss the injector after the first oscillation, it follows that the current after one oscillation (at time $t_0$) must satisfy the inequality $$(9b) \quad i_0 > 2.5\gamma \frac{m_0 c^2}{e} \theta_i^2 \frac{h^2}{b_0^2}$$

Consequently at the end of the injection period the current $I_i$, at the coil 27 must satisfy the inequality $$(10) \quad I_i > i_0 \left(\frac{T_i}{t_0}\right)^2$$

where $T_i$ is the duration of the injection period. Substituting from Equation 9a inequality 9b, and $$\gamma m_0 c^2 / e = V/300$$

where V is the electron energy in e.v., we obtain $$(10a) \quad I_i > \frac{V\theta_i^2}{120}\left(\frac{\theta_i cT_i}{\pi h}\right)^2 \frac{1}{4}\left(\frac{h}{b_0}\right)^4$$

The amplitude $b_0$ must be smaller than $h$ and in order to secure safe clearance of the injection tubes assume $b \approx 0.7h$. The inequality 10a then becomes $$(11) \quad I_i > \frac{V\theta_i^2}{120} \frac{T_i^2 (c\theta_i)^2}{(\pi h)^2} \text{ ampere turns}$$

Figure 5:
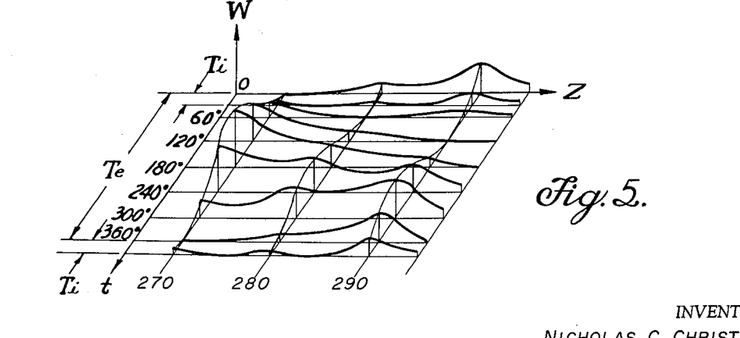
FIGURE 5 is a two-dimensional curve showing the variation in time and along the axial direction, of the vector (magnetic) potential, employed to effect injection of the relativistic electrons.

After the injection phase is over a ring of rotating electrons is trapped in the trough of the magnetic potential between coils 27 and 28. The variation of the vector (or magnetic) potential of the 3 coils 27, 28 and 29 along the cylindrical surface of radius $r_1$ and as a function of time is depicted in FIGURE 5. As shown therein, the lines 270, 280 and 290 indicate the median planes of the coils 27, 28 and 29, respectively, the periodic repetition of the injection process being $Te$. As indicated in FIGURE 5 the current in the coil 28 lags the current in the coil 27 by 60° and the current in coil 29 lags the current in coil 28 by 60° so that a 60° phase difference exists between adjacent coils. Hence a traveling wave is created in the region between coils 27 and 29 which transfers the ring of electrons to the second region between the coils 28 and 29. Thereafter the current in coil 29 is decreasing and the E-layer penetrates into this second region to a limited extent. Simultaneously the electrons contained in the trapped ring are displaced into the E-layer region and there merge with the E-layer. In the last phase of the injection process the E-layer is again pushed out of the second region, the preinjection conditions are re-established and the injection process is repeated cyclically.

The maximum value of the current of the coils 28 and 29 must be such that electrons in the E-layer which undergo scattering resulting in an increase of their axial momentum are prevented from crossing over the "hill" of the vector potential created by the current in these coils. For purposes of illustration, let $I_0$ be the maximum value of the current in these coils and $\phi_s$ be the probable scattering angle. The electrons will then cross over the "hill" if the scattering angle exceeds the value $\theta_0$, where $$(12) \quad \theta_0^2 > \frac{120 I_0}{V}$$

The probability, P, that an electron will be scattered into an angle $\theta_0$ is $$P = e^{-\theta_0^2/\theta_s^2}$$

let $$K = \ln\left(\frac{1}{P}\right) = \theta_0^2 / \theta_s^2$$

then $$(12a) \quad I_0 = \frac{KV\theta_s^2}{120} \text{ ampere turns}$$

From whence it is apparent that the number of electrons lost in this way becomes negligible for a value of $K \approx 10$. The maximum value of the current at the reflecting coil 31 at the other end of the vessel should be of the same order or somewhat smaller. The maximum value of the current in coil 27 should be about twice the value of the current in coils 28 and 29.

As the injection of electrons continues the charge in the E-layer rises. Since Equation 2 must be satisfied the external field is increased during this operation so that the radius of the E-layer remains approximately constant. During this buildup period, the initial plasma formation and the creation of the electromagnetic field pattern is accomplished as described above. Thenceforth operation is continued as described hereinafter following some theoretical considerations to clarify this operation.

As soon as the E-layer 71 in combination with the external field $B_0$ (produced by the excitations of coils 23, 24) creates the desired electromagnetic field pattern, as described above, the density of the plasma can be increased. At this stage the plasma is losing energy mostly by diffusion which is a relatively slow process. The diffusion loss is considerably reduced as the plasma temperature rises above 1000 ev. Above this value the bremsstrahlung loss becomes predominant. In order to cause the plasma temperature to rise, the energy losses of the plasma must be less than the energy gain obtained by the scattering of the plasma electrons by the relativistic electrons on the E-layer. The allowed plasma density is a function of the energy of the electrons of the E-layer and this relation is given hereinafter. The diffusion velocity is given by the known formula $$(13) \qquad v = -\frac{1}{r_e t n} \frac{\nabla p}{B^2} \text{ cm./sec.}$$

where $r_e$ is the classical electron radius, $t$, the mean-time between Coulomb collision in the plasma, $n$ the plasma density, $\nabla p$ the pressure gradient and $B$ the magnetic field intensity. In order to evaluate the diffusion losses the values $\nabla p, t, n,$ and $B$ are required to be specified as a function of position within the plasma. These quantities may be derived from hydrodynamic, diffusion and Maxwell's equations. Since the reaction volume is a long cylinder the magnetic lines along this cylinder are parallel to the axis of symmetry except near the ends where the magnetic flux emerges from the internal region (the internal region is the volume enclosed by the E-layer) and returns in the opposite direction through the cylindrical volume enclosed between the E-layer and the plasma boundary surface of radius $r_0$. In the region where the lines are straight and parallel to the axis it is apparent that at any point the following relation applies $$(14) \qquad p = \frac{B_0^2 - B^2}{8\pi}$$

where $B_0$ is the intensity of the external magnetic field as defined above in equation 6a, and $p$, $B$ the pressure and magnetic field intensity, respectively, at that particular point.

Since the plasma is axially symmetric, cylindrical coordinates $r, \theta, z$, may be employed. Then the vector potential $A\theta$ exists only in the azimuthal ($\theta$) direction due to axial symmetry. In addition this vector potential is a function of $r$, and $z$, only, and no field component exists in the azimuthal direction, to a first approximation. It is known that the quantity $rA\theta$ which is proportional to the magnetic flux is constant along a magnetic line. The same applies for the pressure which is also constant along a magnetic line. As one moves from the ends toward the median plane of the reaction volume the magnetic lines tend to become parallel to the axis and consequently independent of $z$. Therefore the solution for the vector potential can be written as $$(15) \qquad A_\theta = f_1(r) + f_2(r) \frac{\cos h(kz)}{\cos h(kL)}$$

where $k$ is of the order of $r_0^{-1}$, L the length of the reaction volume and $f_1$ and $f_2$ functions of $r$ to be specified, and $z$ measured from the median plane of the vessel 11.

There are an infinite number of solutions which meet the condition of constancy of the pressure and the flux along the magnetic lines and also satisfy Equation 14 and the other hydrodynamic and Maxwell's equations.

The plasma particles diffuse outward from the plasma boundary surface 72 as defined above, and encounter open magnetic lines, for example line 76 in FIGURE 8. These particles then are linked with this line and travel therealong to leave the reaction volume of the vessel 11 following this line 76 or neighboring lines. Hence all the diffused plasma flows out of the vessel 11 in the form of two collimated beams moving parallel to the axis of symmetry and emerging from each end of the vessel. These beams are extracted through tubes 13 and may be directly utilized as they contain at least a part of the plasma energy released by the fusion reactions. However, the diffusion through the end surface of the plasma boundary 72 can be neglected in the following consideration of plasma losses inasmuch as the cylindrical part of the plasma is very long as compared to its diameter. Hence, in the following only the diffusion loss per cm. length of the plasma along the cylindrical part will be considered. This energy loss by diffusion is:

$$(16) \qquad W_d = 2\pi r_0 2 N_0 e u . v(r_0) \text{ ergs/cm. sec.}$$

where $u$ is the plasma temperature in e.s.u., and $v(r_0)$ the diffusion velocity as given in Equation 13, evaluated at $r=r_0$, the radius of the plasma boundary, and $N_0$ the plasma density.

The energy transferred to the plasma by Coulomb scattering of the plasma electrons with the relativistic electrons of the E-layer is $$(17) \qquad W_e = (eV_0) N c n_0 \sigma_0 \text{ ergs/cm. sec.}$$

where N is the number of relativistic electrons per cm. of length of the E-layer, and $eV_0$ the rest energy of the electron.

The plasma temperature can rise to any desired value as long as $$(18) \qquad W_e > \alpha W_d$$

where $\alpha$ is the ratio of the plasma losses from all possible processes to the rate of diffusion loss. It may be calculated that under certain conditions the allowed plasma density may be $$(19) \qquad n_0 > \frac{\gamma^4}{r_e} \frac{\cos^2 \delta}{\alpha^2 16 \pi r_i^2}$$

As an illustrative example assume $$\frac{\cos^2 \delta}{\pi r_i^2} = 10^{-5}, \gamma = 100$$

then $$n_0 < 2.10^{14}/\alpha^2$$

Calculations indicate that $\alpha$ is very close to unity. Hence it can be concluded that provided that the energy of the relativistic electrons of the E-layer is high enough (of the order of 50 mev.) it is possible to raise the temperature of a plasma (whose density is a few times $10^{14}$) not only up to ignition temperature but to a much higher temperature. It should be noted that this can be accomplished without the help of attendant fusion energy. After reaching the high density and temperature condition required to obtain the desired reaction rate or power output fusionable fuel atoms or molecules, e.g., D, T, Li, etc., can be introduced to produce energy by thermonuclear reactions. These results are of extreme importance in that it is possible to maintain the plasma at high temperature and density as required for the fusion process merely by the mechanism of abstracting energy from the relativistic electrons. This provides a great flexibility in the operation of the apparatus. The power level can be changed by merely injecting pure hydrogen together with the fusionable material thus reducing the power level without the necessity of changing the magnetic field, which is a slow process due to the long time constant of coil 23 in the sizes required for large scale operation. Of course, it is not necessary to inject fusionable atoms only after the high temperature condition is achieved. It is obvious that during the process of building up of the plasma energy obtained the injection of fusionable atoms will expedite achievement of the final operating conditions. In the above calculations, the assistance from thermonuclear reactions has not been considered during the heating periods in order to demonstrate the feasibility of reaching ignition temperature utilizing only the heating mechanism of the E-layer.

Since the plasma particles are continuously lost by diffusion they must be replaced by injection of neutral particles. The number of such particles which must be injected per cm. length of the reaction volume is (20) $\qquad N_p = 2\pi r_0 n V(r_0)$ From Equations 20, 13 and 14 after substituting $$B_z = \frac{\partial y}{r \partial r}$$

where $$y = r A_\theta$$

and $$\tau = \left(\frac{5 \cdot 10^5}{u}\right)^{3/2} \cdot \frac{1}{n_0 \delta_0 c}$$

we obtain:

(21) $\qquad N_p = 3 n_0 \left(\frac{5 \cdot 10^5}{U}\right)^{3/2} \cdot G$ atoms/cm/sec.

where $$G = \left[\frac{\partial}{\partial r}\left(\cdot \frac{\partial y}{r \partial r}\right)\right] / \left(\frac{\partial y}{r \partial r}\right)$$

the quantity G is evaluated at $r = r_0$; U is the plasma temperature in e.v. The value of G depends on the particular solution for $y = r A_\theta$ selected from the numerous possible solutions satisfying the requirements that the quantity $r A_\theta$ (magnetic flux) and plasma pressure are constant along a magnetic line. The above theoretical calculations are adequate to calculate the required amount of gas injection during the buildup phase of the plasma.

The operation of building-up the plasma is effected as follows. After the electromagnetic field pattern is established by building up the E-layer, the injection of neutral particles is continued as prescribed from Equation 21 while at the same time the external field is raised slowly from the value $B_0 = B_w$ up to $B_0 = B_{max}$ where $B_{max}$ corresponds to the desirable plasma pressure for the steady state operation of the apparatus. Hence, $B_0$ varies with time as $$B_0 = B_{max} f(t)$$

where $F(t)$ can be arbitrary. The total time, however, required for the change of the impressed field $B_0$ from $B_w$ to $B_{max}$ cannot be less than several minutes as the time constant of solenoid 23 is of that order. The temperature and density of the plasma may be measured during this period by known techniques of measuring bremsstrahlung or employing microwaves to measure plasma density or using neutron counters. These measuring devices can be arranged to automatically indicate the number $N_p$ required. Thus the operator of the apparatus can adjust the gas value and inject the proper amount of gas. However, this is not critical and even without any theoretical calculation it is possible to adjust the gas empirically during operation in such a way that the temperature indicator keeps rising. As the magnetic field $B_0$ reaches its maximum value one can adjust the amount of energy released at the desired level by properly proportioning the fuel mixture which is injected in the form of deuterium gas or tritium-deuterium gas, etc.

It will be appreciated by those skilled in the art that there are many practical applications of the above-described method and apparatus for producing thermonuclear reactions on a large scale. A particularly important application is found in the generation of electrical power and there follows as examples brief descriptions of two such applications.

As a first example of electrical power production, consider the direct use of the emergent plasma beams or jets at the vessel ends. In this case it is desirable to employ thermonuclear reactions producing charged by-products and one such type of reaction is:

$$Li^6 + D = 2He^4 + 22.4 \text{ mev.}$$

In this reaction the two α particles (i.e., the reaction byproducts) acquire an energy of 11.2 mev. each as a result of the reaction. Consequently, the Larmor radius of these particles is much greater than that of the plasma ions and as a result, at least a part of these high energy α-particles will emerge from the plasma to hit the inner wall before losing their energy to the plasma by Coulomb collisions. Since these particles have a double charge they can penetrate a potential difference up to 5.6 mv. Consequently it is possible to develop a potential between the plasma and the inner wall of the vessel. The value of this potential is of course less than 5 mv. However, the plasma as a whole becomes negatively charged with respect to the inner walls of the vessel. The plasma jet emerging along the axis from the two ends of the reacting volume contains at least in part more electrons than ions and those electrons are more energetic than the average plasma electrons since they are accelerated as they traverse the potential difference between the plasma and the vessel. Thus, at least a part of the energy released in the thermonuclear reactions is contained in the plasma jet in the form of an energetic electron beam. This beam can be guided away within the tube 13 by disposing about it a suitable focusing arrangement, for example, by strong focusing, as described in my U.S. Patent No. 2,736,799. The intensity of the energetic electron beam can be modulated by periodically varying the amount of injected neutral atoms or molecules. This modulated beam therefore can be guided by means of appropriate apparatus and manipulated so that at least a part of the energy can be abstracted and transformed into utilizable electric energy. Such apparatus can be, for example, a transformer where the primary coil is a hollow tube wherein the electron beam is guided by proper focusing means. Such a device is described in my United States patent applications Serial Nos. 360,576 and 607,841, entitled Magnetic Cable. The former was issued as Patent No. 2,898,456 on August 4, 1959. Since the electron beam current varies in time, this variation induces an electromotive force in the secondary of the transformer. Upon loading the secondary of the transformer an electromotive force is induced in opposition to the force producing same so as to decelerate the electrons in the beam, thus abstracting energy from the beam.

Figure 7:
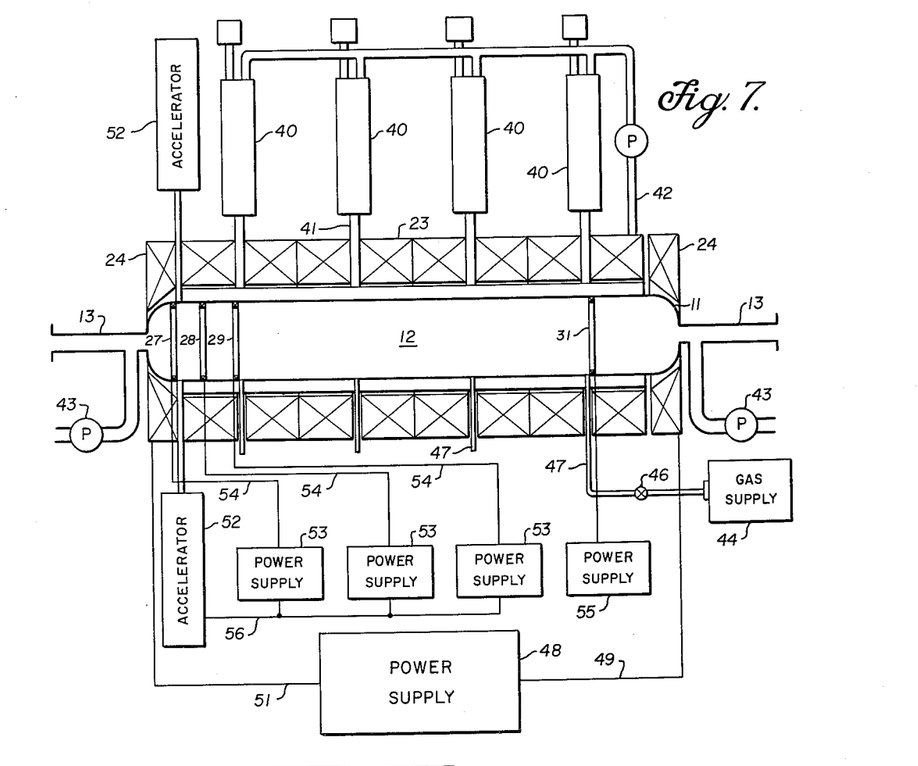
FIGURE 7 is a block diagram schematically illustrating the way in which the various auxiliary components are arranged in a typical thermonuclear electrical power generating installation.

A second application of the thermonuclear reactor hereof to produce electrical power is the utilization of an intermediate steam cycle and an example of apparatus suited to this use is schematically illustrated in the block diagram of FIGURE 7, with details shown in part in FIGURES 1–6. Referring to FIGURE 7, turbogenerators with their auxiliary apparatus are shown at 40 and are operated by steam emerging from manifold 22 and conveyed to the turbogenerators 40 by means of steam lines 41, while the condensed coolant is returned, e.g., as by pumping through return line 42 to manifold 20 to be reheated. Suitable switchgear is associated with the turbogenerator, as shown. Vacuum pumps 43 are coupled to vacuum exhaust conduits 13. A fusionable fuel gas supply 44 may also be coupled to conduit 13 through valves 46 and conduits 47, or, alternatively conduits 47 may lead directly into vessel 11 at any other location as indicated. A direct current power supply 48 may be coupled by means of distribution lines 49 and 51 to the solenoid 23 and end coils 24 in accordance with conventional practice. Electron accelerators 52 including auxiliary equipment are arranged to direct an accelerated electron beam through tubes 26, as described above. A plurality of modulated direct current power sources 53 are coupled by paired conductors in a transmission line cable 54 to the trapping coils 27, 28 and 29, respectively, while a similar conductor pair may be employed to energize coil 31 with a steady direct current from a power supply 55, as described above. D.C. source 53 may be linked by line 56 to accelerators 52 in order to provide properly synchronized electron beam pulse outputs for most efficient injection by triggering the output thereof to begin injection at the time noted above.

Figure 1:
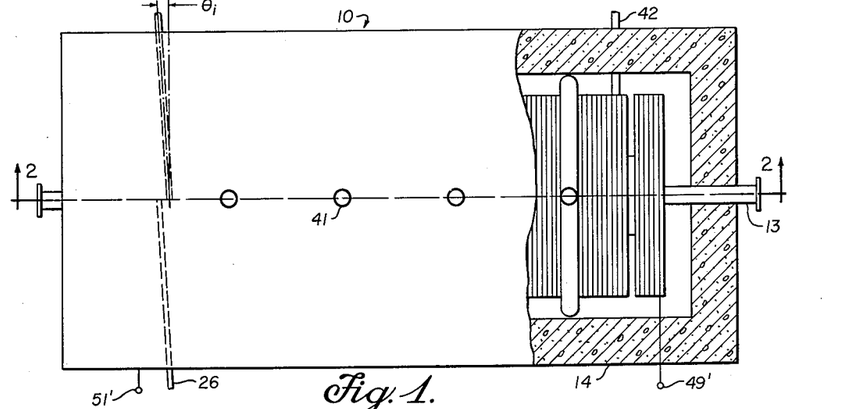
FIGURE 1 is a plan view of the apparatus partially in cross-section.
Figure 2:
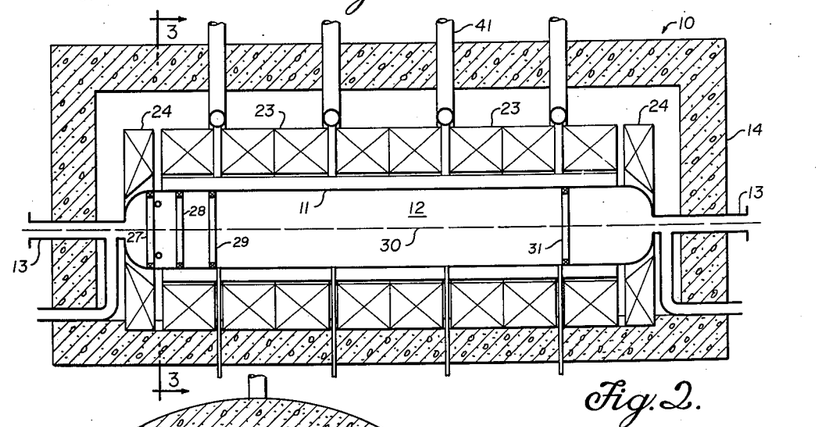
FIGURE 2 is a cross-sectional view of the apparatus through the line 2—2 of FIGURE 1.
Figure 3:
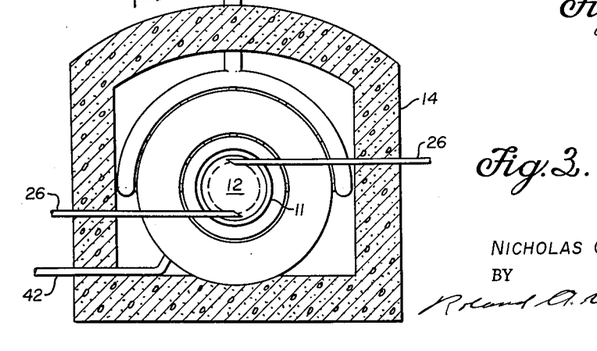
FIGURE 3 is a cross-sectional view along the line 3—3 of FIGURE 2 to indicate the arrangement of the electron injectors.
Figure 4:
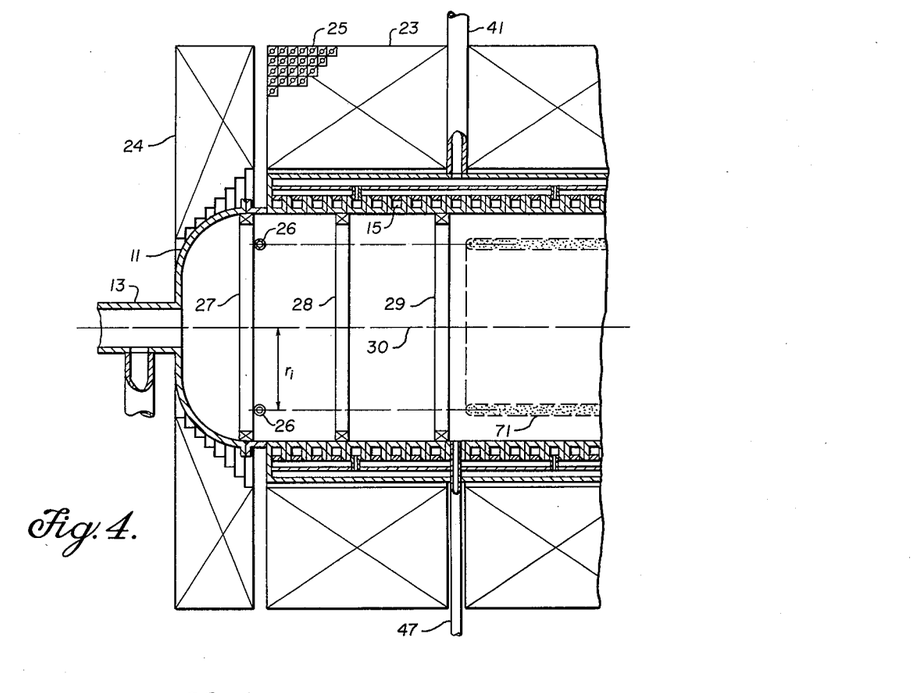
FIGURE 4 is an enlarged cross-sectional view of injector end portions of the apparatus of FIGURE 2 showing details of the injector end of the vessel.

In the layout of FIGURE 7, use is made of the energy released by the thermonuclear reactions in the form of kinetic energy of charged particles and neutrons to heat the inner wall of the vessel to produce high pressure steam as, for example, may be accomplished within the special channels 15, as shown in FIGURES 2, 4 and 6, and described above. This steam can be utilized to drive turbogenerators to produce electric power. Part of this electric power is utilized for the excitation of the solenoid 23 and end coils 24 employed to establish the externally applied magnetic field, as well as of the other auxiliary coils, and to provide the necessary power to operate the accelerators which supply the energetic electrons required to maintain the E-layer. The difference between the power produced by the turbogenerators minus the power required for these coils and the acceleration of the electrons constitutes the net power production of the system. Obviously in order to obtain an economical utilization of the methods and apparatus proposed herein, it is necessary to optimize the parameters of the reactor.

As mentioned above, the parameters of the apparatus for producing electric power through the steam cycle based on the methods and principles described herein must be selected in such a way that the net electric power production is a substantial part of the electric power produced by the turbogenerators. This can be done by selecting the appropriate value of the intensity $B_0$, of the applied magnetic field (produced by the excitation of coils 23, 24) and the inner radius of the evacuated vessel 11 defining the cylindrical space 12 in order to meet the above conditions. In the following, the energy released by thermonuclear reactions, the energy loss in coil 23 and the power required to accelerate the electrons will be given per cm. length of the reacting volume. The rate of reactions, R, is given, as it is known, by the equation (22) $$R = n_1 n_2 (\overline{\sigma v})$$

where $n_1$, $n_2$ are the density of the two kinds of interacting nuclei. This rate is highest when $n_1 = n_2 = n/2$. Hence (22a) $$R = \tfrac{1}{4} n^2 (\overline{\sigma v})$$

For reactions between the same kind of ions, for example, D-D reactions, the value of R is twice the value indicated by the Equation 22a. The quantity $\overline{\sigma v}$ is the product of the reaction cross-section and the ion velocity averaged over the Maxwellian velocity distribution of the plasma ions. The power released per cubic cm. of the plasma is equal to $W_0$ where (22b) $$W_0 = R \cdot E$$

where E is the utilized fraction of the energy released per reaction. From the following relationships (23) $$n_0 = \frac{p_0}{2eu}$$

where $u$, $p_0$ are the plasma temperature and maximum pressure respectively and (24) $$p_0 = B_0^2/8\pi$$

where $B_0$ is the intensity of the applied external field expressed in gauss and the Equations 22a, 22b, one obtains (25) $$W_0 = 6a\eta \left(\frac{B}{10^4}\right)^4 \left(\frac{\overline{\sigma v}}{u^2}\right) E \cdot 10^{22} \text{ watts/cm.}^3$$

where $a=1$ for fusion reactions between unlike particles (T-D for example) and $a=2$ for reactions between like particles. The quantity $\eta$ is (26) $$\eta = \frac{2}{r_0^2 n_0^2} \int_0^{r_0} n^2 r \, dr$$

The value of $\eta$ in the reactor described herein is almost unity. Therefore, it will be assumed $\eta = 1$ in the following calculations; E is the reaction energy in mev., $\overline{\sigma v}$ is expressed in cm.$^3$/sec.; it is a function of the temperature $u$ and its value is available in the literature. The temperature $u$ in Equation 25 is expressed in electron volts.

The power released per cm. length of the reaction volume is (27) $$W_f = \pi r_0^2 W_0 \cdot 10^{-3} \text{ kw./cm.}$$

where $r_0$ is the radius of the plasma boundary as defined above.

The power per cm. length required to maintain the E-layer is given by Equation 17 and is, of course, the power carried by the injected electron beam, divided by the length of the E-layer. However, the electron accelerator has an efficiency less than one and, in practice the power required to provide the energetic electrons is several times higher than given in Equation 17. As a representative example, the efficiency of the accelerator may be about 20%. Substituting the values of the constants in Equation 17 one obtains (28) $$W_e = 8.5 \left(\frac{n_0}{10^{14}}\right) \left(\frac{\gamma}{100}\right) \text{ kw./cm.}$$

Finally the power required for the coil depends on the ratio $\mu = R_2/R_1$ of the outer to the inner radius of this coil. Assuming a space factor of 80% for the coil the power loss in the coil is (29) $$W_R = .5 \left(\frac{\mu+1}{\mu-1}\right) \left(\frac{B}{10^4}\right)^2 \text{ kw./cm.}$$

The produced net electric power per cm. length of the reaction volume is finally (30) $$W_s = f \cdot W_f - W_R - W_e$$

where $f$ is the overall thermal conversion efficiency of the power plant.

From the above formula it is possible to calculate the parameters of a power reactor and select the proper dimensions of the reactor volume so that the ratio, $s$, of the total produced power ($fW_f$) to the power required to maintain the reacting plasma ($W_R + W_e$) is (31) $$s = \frac{fW_f}{W_R + W_e} \gg 1$$

Such calculations can be carried out without any difficulty by those skilled in the art. Hence elaboration in this subject is considered to be beyond the scope of the present disclosure.

A thermonuclear reactor based on the present invention has an inherent safety mechanism during operation in contrast to fission reactors. In the present method the magnetic field goes through zero in the region of the E-layer within the plasma volume. Hence the maximum plasma pressure ($p_0$) is equal to the external magnetostatic pressure ($B_0^2/8\pi$), consequently, due to this fact, there is no room for more particles in the plasma and any temperature increase causes a decrease of the density.

The reaction rate is proportional to $\overline{\sigma v}/u^2$ which reaches a maximum at a temperature of about 10–50 kv. depending on the type of reactions employed. If the operating temperature of the plasma is above this maximum any increase of the reaction rate which tends to raise the temperature results automatically in a decrease of this reaction rate. In other words the present invention inherently possesses a "negative temperature coefficient" in fission reactor terminology. Hence no nuclear explosion or "runaway" thermonuclear reaction is possible under any circumstance and the reactor "fails safe" with no unmanageable power excursion.

Figure 9:
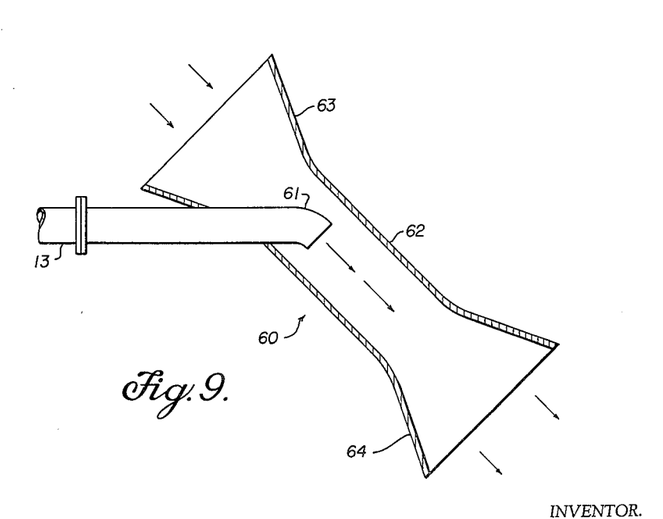
FIGURE 9 shows schematically how compressed gas in a venturi tube can be heated by a diffused plasma beam emerging from the reactor for thermonuclear utilization in a ramjet type device.

Another practical application of the invention is in a completely different field. As described hereinbefore it is possible, by employing certain nuclear reactions which produce charged by-products, to polarize the plasma by allowing such by-products to impinge against the inner-wall of vessel 11 before these charged particles lose their energy to the plasma by Coulomb collisions. The plasma configuration in an end of the reactor may therefore be as shown in FIGURE 8 with a plasma jet 59 emerging axially from the reaction volume to be discharged from tube 13. The plasma jet 59 which emerges from tube 13 comprises, at least in part, a beam of energetic electrons. The energy of this electron beam can be used to heat a compressed gas in the throat of a venturi tube 60 in ramjet devices employed for jet propulsion, e.g., of aircraft. Such a venturi tube arrangement is shown in FIGURE 9 wherein the plasma beam, containing the energetic electrons, is guided through tube 13, nozzle 61 and injected into the throat 62 of the venturi tube 60. Around the tube 13 and nozzle 61 focusing means are disposed to guide the electron beam which is directed in an axial direction through throat 62. The compressed gas entering from the air scoop 63 portion of the venturi tube is heated by the electron beam to a much higher temperature than can be achieved by any chemical fuel. Accordingly, a very high thrust is developed when the heated air is discharged through the diffuser cone 64 of the venturi tube 60.

Details of the operating conditions and design parameters of a controlled thermonuclear reactor constructed in accordance with the invention and exemplifying typical, practical applications of general principles described in the foregoing are set forth in the following specific example:

EXAMPLE

*Parameters for a 500 Megawatt Astron Reactor*

Reaction volume:

| | | |
|---|---|---|
| Diameter | feet | 5 |
| Length | do | 100 |
| E-layer radius | cm | 50 |
| Plasma diameter | cm | 130 |
| Plasma temperature | e.v. | 24,000 |
| Plasma density | | $4.10^{14}$ |
| External magnetic field | gauss | 38,000 |
| Thermonuclear reaction plasma composition— | | |
| Tritium | percent | 40 |
| Deuterium | do | 60 |
| Total thermonuclear energy per cm. length | kw | 900 |
| Total fusion energy output of Astron | megawatts | 2700 |
| Energy output utilized for steam generation | megawatts | 2000 |
| Overall thermal efficiency | percent | 33 |
| Total electrical power output | megawatts | 665 |
| Solenoid energizing current (assuming $\mu=2$) | megawatts | 65 |
| Power to electron accelerators | do | 100 |
| Net electrical power output | do | 500 |

While the description of the invention has included a theory as to a nuclear fusion reaction, it is not to be understood that the invention is limited by such theory and it is intended to claim the invention as defined by the appended claims without regard to such theory. Many other applications of the invention will occur to those skilled in the art.

What I claim is:

1. In a method wherein a gas is raised to a very high temperature to produce a confined plasma in an enclosed evacuated volume, the steps comprising establishing in said volume an elongated substantially axially symmetric magnetic field having a central region of substantially uniform intensity and end regions of increased field intensity, injecting and trapping electrons of relativistic energies therein to form a generally cylindrical layer of electrons rotating about the axis of said magnetic field thereby creating an electromagnetic plasma containment field pattern, and introducing a gas into said volume to enter said field pattern to be ionized and heated up to fusion reaction temperature by macroscopic and microscopic electrical interactions with said relativistic electrons to provide a plasma confined in said electromagnetic field pattern.

2. In a method for raising a gas to a high temperature and producing neutrons therein in an enclosed evacuated spatial volume, the steps comprising establishing in said volume an axially symmetric magnetic field having a central portion of uniform intensity and terminally intensified magnetic field regions therein, injecting energetic electrons tangentially into said magnetic field while producing an intensity variation of said field localized to the region of injection to establish a layer of electrons extending coaxially along the central portion of said magnetic field and terminating in said intensified terminal regions thereof with the electromagnetic field of said layer being super-imposed upon said magnetic field to establish an electromagnetic containment field pattern therein, and introducing gaseous light element fuel into said evacuated volume, whereby such fuel is ionized and heated up to fusion reaction temperature by macroscopic and microscopic electrical interactions with said energetic electrons to form a reaction plasma disposed within said containment field pattern whereupon the neutron producing nuclear reaction is initiated and proceeds with the consumption of said fuel.

3. In a method for raising a gas to a high temperature and producing neutrons therein in an enclosed evacuated spatial volume, the steps comprising establishing in said volume an axially symmetric magnetic field having a central portion of uniform intensity and terminally intensified magnetic field regions therein, injecting energetic electrons tangentially into said magnetic field while producing a local variation of the magnetic field intensity in the injection region of said field to establish a layer of energetic electrons extending coaxially along the central portion of said magnetic field and terminating in the region of said intensified terminal regions thereof with the electromagnetic field of said layer being superimposed upon said magnetic field to establish an electromagnetic plasma containment field pattern therein, introducing gaseous light element fuel into said evacuated volume, whereby such fuel is ionized and heated up to fusion reaction temperature by macroscopic and microscopic electrical interactions with said energetic electrons to form a reaction plasma disposed within said containment field pattern whereupon the neutron producing nuclear reaction is initiated with the production of energetic particles and radiation, and utilizing the energetic products of the reaction.

4. In a controlled thermonuclear reaction method conducted in an enclosed evacuated spatial volume, the steps comprising establishing in said volume an axially symmetric magnetic field having intensified terminal field regions; injecting and trapping energetic electrons into said field to produce a generally cylindrical E-layer of energetic electrons rotating about the axis within said field; introducing a thermonuclear fuel gas into said volume to be ionized and heated to fusion temperature by macroscopic and microscopic interactions with said electrons with the ions being attracted to and confined to form a plasma within the electromagnetic field pattern produced by superimposition of the electromagnetic field of said electrons upon said magnetic field, said field pattern and the containment effect thereof being amplified by the field produced by the Hall current caused by the plasma pressure gradient and by the electrostatic field potential increase produced by the increased plasma temperature; progressively increasing the intensity of the established magnetic field while continuing injection of energetic electrons into said field and introduction of fuel to increase the plasma density and heat the plasma to initiate a thermonuclear reaction and attain a selected reaction rate; maintaining said field while continuing injection of electrons and introduction of thermonuclear fuel to maintain the selected thermonuclear reaction rate; and utilizing the energetic products of said reaction.

5. In a controlled thermonuclear reaction method conducted in an enclosed evacuated volume, the steps comprising producing in said volume an elongated axially symmetric magnetic field having a central region of uniform field intensity and end regions of increased field intensity, injecting high energy electrons tangentially into said field while producing a local variation in said field to trap said electrons in said field thereby providing an electron-layer of energetic electrons rotating therein to create an electromagnetic containment field pattern with the electromagnetic field of the electrons of said layer being superimposed on said unidirectional and substantially uniform magnetic field to establish said electromagnetic field pattern injecting fusionable atoms into the volume enclosed by said field pattern, said atoms being ionized and the resultant plasma being heated up to a fusion reaction temperature by macroscopic and microscopic electrical interactions with the relativistic electrons of said electron layer, said field pattern and the containment effect thereof being amplified by the field produced by the Hall current caused by the plasma pressure gradient and by the electrostatic field potential increase produced by the increased plasma temperature increasing the intensity of said magnetic field to a value determined by the increasing plasma pressure and simultaneously increasing the charge of said layer to maintain the radius of said electron layer constant about said axis of symmetry; thereafter increasing the intensity of said magnetic field to a value corresponding to a plasma pressure determined by the desired rate of said thermonuclear reactions, and thereafter maintaining constant the intensity of said field, replacing the electrons of the layer lost thereto through scattering processes while replacing ions and electrons lost from the plasma by fusion and diffusion.

6. In a controlled thermonuclear reaction method conducted in an enclosed evacuated spatial volume, the steps comprising establishing in said volume an axially symmetric magnetic field having intensified terminal field regions; directing a beam of energetic electrons tangentially into a plane in said field and effecting a phased variation in the intensity of the magnetic field intensity in first and second planar regions to each side of the electron injection plane to trap said electrons in the region between said planes, effecting a phased variation in the magnetic field intensity in a third planar region inwardly of said second planar region acting to transport the trapped electrons into a second region between the second and third regions of varied intensity and finally into central portions of said field to produce a generally cylindrical E-layer of energetic electrons rotating about the axis within said field; introducing a thermonuclear fuel gas into said volume to be ionized by said electrons with the ions being attracted to and confined to form a plasma within the electromagnetic field pattern produced by superimposition of the electromagnetic field of the electrons of said E-layer upon said magnetic field, said plasma cooperating to amplify the containment effect of the electromagnetic field pattern; progressively increasing the intensity of the established magnetic field while continuing injection of energetic electrons into said field and introduction of fuel to increase the plasma density and heat the plasma to initiate a thermonuclear reaction and attain a selected reaction rate; maintaining said field while continuing injection of electrons and introduction of thermonuclear fuel to maintain the selected thermonuclear reaction rate; and utilizing the energetic products of said reaction.

7. In a controlled thermonuclear reaction method conducted in an enclosed evacuated spatial volume, the steps comprising establishing in said volume an axially symmetric magnetic field having a central portion of uniform intensity and terminally intensified magnetic field regions therein, injecting energetic electrons tangentially into said magnetic field while producing a local variation in the injection region of said field to establish a layer of energetic electrons extending coaxially along the central portion of said magnetic field and terminating in the region of said intensified terminal regions thereof with the electromagnetic field of said layer being superimposed upon said magnetic field to establish an electromagnetic plasma containment field pattern therein, introducing gaseous thermonuclear fuel into said evacuated volume, whereby said fuel is ionized and heated by macroscopic and microscopic interactions with said energetic electrons and the thermonuclear fuel ions are confined within said electromagnetic field pattern whereupon the thermonuclear reaction is initiated with the production of energetic particles and radiation, and impinging at least a portion of said energetic particles and radiation upon a heat transfer surface of a heat exchange system to convert the kinetic energy of said particles and radiation into heat, and removing the heat produced by the reaction by means of the heat transfer medium of said system.

8. In a controlled thermonuclear reaction method conducted in an enclosed evacuated spatial volume, the steps comprising establishing in said volume an axially symmetric magnetic field having a central portion of uniform intensity and terminally intensified magnetic field regions therein, injecting energetic electrons tangentially into said magnetic field while producing a local variation in the injection region of said field to establish a layer of energetic electrons extending coaxially along the central portion of said magnetic field and terminating in the region of said intensified terminal regions thereof with the electromagnetic field of said layer being superimposed upon said magnetic field to establish an electromagnetic containment field pattern therein, introducing gaseous thermonuclear fuel into said evacuated volume whereby said fuel is ionized and heated by macroscopic and microscopic interactions with said energetic electrons and the thermonuclear fuel ions are confined within said electromagnetic field pattern whereupon the thermonuclear reaction is initiated with the production of energetic particles and radiation from the contained thermonuclear reaction plasma and diffusive loss portions of said plasma emerge in the form of at least one beam axially outward from the ends of said pattern, and contacting said beams with a gas to heat said gas to a high temperature.

9. In a controlled thermonuclear reaction method conducted in an enclosed evacuated spatial volume, the steps comprising establishing in said volume an axially symmetric magnetic field having a central portion of uniform intensity and terminally intensified magnetic field regions therein, injecting energetic electrons tangentially into said magnetic field while producing a local variation in the injection region of said fiield to establish a layer of energetic electrons extending coaxially along the central portion of said magnetic field and terminating in the region of said intensified terminal regions thereof with the electromagnetic field of said layer being superimposed upon said magnetic field to establish an electromagnetic containment field pattern therein; introducing gaseous thermonuclear fuel into said evacuated volume, whereby said fuel is ionized and heated by macroscopic and microscopic interactions with said energetic electrons and the thermonuclear fuel ions are confined within said electromagnetic field pattern whereupon the thermonuclear reaction is initiated with the production of energetic particles and radiation from the contained thermonuclear reaction plasma and diffusive loss portions of said plasma emerge in the form of at least one beam axially outward from the ends of said pattern, and contacting said beam with a gas in a venturi throeat to heat said gas to a high temperature, and ejecting the heated gas from the venturi tube to produce propulsive thrust.

10. In a controlled thermonuclear reaction method conducted in an enclosed evacuated spatial volume, the steps comprising establishing in said volume an axially symmetric magnetic field having a central portion of uniform intensity and terminally intensified magnetic field regions therein, injecting energetic electrons tangentially into said magnetic fiield while producing a local variation in the injection region of said field to establish a layer of energetic electrons extending coaxailly along the central portion of said magnetic field and terminating in the region of said intensified terminal regions thereof with the electromagnetic field of said layer being superimposed upon said magnetic field to establish an electromagnetic containment field pattern therein, introducing gaseous thermonuclear fuel capable of producing energetic charged particle products and in modulated volumes into said evacuated volume, whereby said fuel is ionized and heated by macroscopic and microscopic interactions with said energetic electrons and the thermonuclear fuel ions are confined within said electromagnetic field pattern whereupon the thermonuclear reaction is initiated with the production of energetic particles which escape from the field pattern and cause the plasma to assume a negative charge thereby causing plasma diffusively lost as a beam axially outward from the system to include a modulated beam of energetic electrons, and inductively coupling said modulated energetic beam of electrons with an electrical load circuit to produce an alterntaing current therein.

11. In apparatus for producing a confined high temperature plasma, in combination solenoidal coil means for producing an elongated linear axially symmetric magnetic field, electron source means disposed to inject a beam of energetic electrons tangentially into said magnetic field, means including solenoidal coils disposed coaxially to said solenoidal coil means for producing a local variation in the axially symmetric magnetic field in the region of injection of said electron beam for trapping the injected ions, and means for introducing gaseous atoms into the volume enclosed by said solenoidal coil means.

12. In apparatus for producing a confined high temperature plasma, in combination solenoidal coil means for producing an axially symmetric magnetic field having a central portion of uniform intensity and termial regions of increased intensity, electron source means disposed to inject a beam of energetic electrons tangentially into said magnetic field, means including solenoidal coils disposed coaxially to said solenoidal coil means for producing a local variation in the axially symmetric magnetic field in the region of injection of said electron beam to trap said electrons, and means for introducing gaseous atoms into the volume enclosed by said solenoidal coil means.

13. A reactor for raising a gas to a high temperature and inducing energetic radiation producing reactions therein, comprising means including an elongated generally cylindrical vessel for producing an evacuated space, solenoid means disposed to provide an essentially exially symmetric magnetic field having a central region of uniform intensity and end regions of increased intensity within said space, means for injecting high energy electrons into said magnetic field to produce a layer of energetic electrons rotating therein, whereby an electromagnetic field pattern is created therein, and means for introducing nuclear reactable gaseous fuels into said field pattern wherein the fuel atoms are ionized, heated and confined to produce a high temperature plasma wherein said radiation producing reactions occur.

14. A reactor as defined in claim 13 wherein said vessel is provided with heat transfer means including a heat transfer surface serving as the interior surface of said vessel upon which energetic radiation may impinge and a heat transfer loop in which a heat transfer agent transfers heat from said surface to an external point for use.

15. A reactor for raising a gas to a high temperature and inducing energetic radiation producing reactions therein, comprising means including an elongated cylindrical vessel for producing an evacuated space, solenoid means disposed to provide an axially symmetric magnetic field having a central region of uniform intensity and end regions of increased intensity within said space, first, second and third solenoidal coils arranged coaxially parallel in peripheral regions of said vessel and defining first and second injection zones between the respective pairs of solenoids, electron accelerator means arranged to direct an energetic beam of electrons tangentially into said first injection zone, means for supplying modulated direct current to said first, second and third coils said current being phased to trap said electrons in the first injection zone and transport the trapped electrons sequentially into said second injection zone and finally into said central magnetic field region to produce a rotating cylindrical E-layer of energetic electrons therein, whereby an electromagnetic containment field pattern is created therein, and means for introducing nuclear reactable gaseous fuels into said field pattern to be ionized, heated and confined to produce a high temperature plasma wherein said radiation producing reactions occur.

16. A controlled thermonuclear reactor comprising means including an elongated cylindrical vessel for producing an evacuated space, solenoidal means disposed to provide an axially symmetric magnetic field having a central region of uniform intensity and end regions of increased intensity within said space, first, second and third solenoidal coils arranged coaxially parallel in peripheral regions of said vessel and defining first and second injection zones between the responsive pairs of solenoids, electron accelerator means arranged to direct an energetic beam of electrons tangentially into said first injection region, means for supplying modulated direct current to said first, second and third coils said current being phased to trap said electrons in the first injection zone and transport the trapped electrons sequentially into said second injection zone and finally into said central magnetic field region to produce a rotating cylindrical E-layer of energetic electrons therein, whereby an electromagnetic containment field pattern is created therein, means for introducing thermonuclear fuels into said field pattern to be ionized, heated and confined to produce a controlled thermonuclear reaction plasma, and utilization means arranged to utilize the energetic particle and radiation energy emergent from the reaction.

17. The reactor as defined in claim 16 wherein said utilization means comprises a circuit inductively coupled to the axial diffusive exit beam of the reactor to produce electrical current in an exterior circuit.

18. The reactor as defined in claim 16 wherein said utilization means comprises a ramjet propulsion venturi arranged so that the axial diffusive exit beam from said reactor is directed through the throat thereof.

19. A controlled thermonuclear reactor comprising means including an elongated cylindrical vessel for producing an evacuated space, said vessel being constructed with a plurality of longitudinal channeled sections of which the inner faces thereof constitute the inner peripheral surface of said vessel, manifold means communicating with the channels of said sections for introducing and discharging a heat transfer agent as part of a heat transfer loop, solenoid means disposed to provide an axially symmetric magnetic field having a central region of uniform intensity and end regions of increased intensity within said space, first, second and third solenoidal coils arranged coaxially parallel in peripheral regions of said vessel and defining first and second injection zones between the respective pairs of solenoids, electron accelerator means arranged to direct an energetic beam of electrons tangentially into said first injection region, means for supplying modulated direct current to said first, second and third coils said current being phased to trap said electrons in the first injection zone and transport the trapped electrons sequentially into said second injection zone and finally into said central magnetic field region to produce a rotating cylindrical E-layer of energetic electrons therein, whereby an electromagnetic containment field pattern is created therein, and means for introducing thermonuclear fuels into said field pattern to be ionized, heated and confined to produce a controlled thermonuclear reaction plasma.

20. Apparatus for raising a gas to a high temperature and producing neutrons therein comprising solenoidal coil means enclosing an evacuable volume and for producing therein an axially symmetric magnetic field having a linear central region and terminally disposed regions of increased intensity, electron source means including magnetically shielded guide tubes disposed to inject beams of energetic electrons at a slight angle to a plane of reference normal to said field within said volume, means including solenoidal coils disposed coaxially to said solenoidal coil, means adjacent said guide tubes for producing a local variation in the axially symmetric magnetic field in the region of injection of said electron beams for trapping said electrons to form a cylindrical electron layer rotating in said field, and means for introducing low atomic number atoms into said evacuated volume wherein said atoms interact with said electron layer and are ionized and heated so that the heated ions are trapped and confined within the electromagnetic field pattern produced by said electron layer rotating within said magnetic field thereby being prevented from colliding with the boundaries of said volume and to produce neutrons by nuclear reactions.

21. Apparatus for raising a gas to a high temperature and producing neutrons therein comprising solenoidal coil means enclosing an evacuable volume and for producing therein an axially symmetric magnetic field having a linear central region and terminally disposed regions of increased intensity, electron source means including at least one magnetically shielded guide tube disposed to inject beams of energetic electrons at a slight angle to a plane of reference normal to said field within said volume, means for trapping electrons including first and second solenoidal segments disposed to each side of said guide tube coaxially to said axially symmetric field defining a first zone into which said electrons are first injected and a third solenoidal segment disposed outwardly from one of the aforesaid segments and defining therewith a second zone and means for energizing said solenoidal segments with a modulated current whereby electrons injected into said first zone are trapped and are progressively ejected into said second zone and finally into said axially symmetric magnetic field to form a cylindrical electron layer rotating therein, and means for introducing hydrogen isotope atoms into said evacuated volume wherein said atoms interact with said electron layer and are ionized and heated so that the heated ions are trapped and confined within the electromagnetic field pattern produced by said electron layer rotating within said magnetic field thereby being prevented from colliding with the boundaries of said volume and to produce neutrons by nuclear reactions.

22. A method for raising a gas to high temperatures and producing neutrons therein comprising establishing an elongated axially symmetric magnetic field having a linear central portion of uniform intensity and terminally intensified magnetic field regions in an evacuated spatial volume, injecting energetic electrons at a slight angle to a plane normal to said field and varying the intensity of the field in the region of injection to produce a layer of electrons rotating about the axis of said field the electromagnetic field of said layer together with said axially symmetric field providing an electromagnetic containment field pattern in said volume, and introducing low atomic weight atoms into said volume to be ionized and heated by interaction with the energetic electrons of said layer with the heated ions being constrained within said containment field pattern and prevented from colliding with the boundaries of said volume to induce neutron producing reactions between said ions.

23. The method as defined in claim 22 wherein said low atomic weight atoms are selected from the isotopes of hydrogen.

24. A method for raising a gas to high temperatures and producing neutrons therein comprising establishing an elongated axially symmetric magnetic field having linear central portion of uniform intensity and terminally intensified magnetic field regions in an evacuated spatial volume, injecting energetic electrons at a slight angle to a plane normal to said field and varying the intensity of the field in the region of injection in a first zone defined between adjacent solenoidal segments disposed coaxially to said axially symmetric field with a second zone disposed between one of said segments and a third solenoidal segment and modulating energizing current to said solenoidal segments so as to locally vary the axially symmetric field to trap said electrons in said first zone and progressively eject same into said second zone and finally into the linear portion of said magnetic field to produce a layer of electrons rotating about the axis of said field with the electromagnetic field of said layer together with said axially symmetric field providing an electromagnetic containment field pattern in said volume, and introducing low atomic weight atoms into said volume to be ionized and heated by interaction with the energetic electrons of said layer with the heated ions being constrained within said containment field pattern and prevented from colliding with the boundaries of said volume to induce neutron producing reactions between said ions.

25. The method as defined in claim 24 wherein said low atomic weight atoms are selected from the isotopes of hydrogen.

References Cited in the file of this patent

UNITED STATES PATENTS

| | | |
|---|---|---|
| 1,948,384 | Lawrence | Feb. 20, 1934 |
| 2,193,602 | Penney | Mar. 12, 1940 |
| 2,246,121 | Blewett | June 17, 1941 |
| 2,507,653 | Smith | May 16, 1950 |
| 2,910,414 | Spitzer | Oct. 27, 1959 |

FOREIGN PATENTS

| | | |
|---|---|---|
| 656,398 | Great Britain | Aug. 22, 1951 |

OTHER REFERENCES

Reviews of Modern Physics, vol. 28, No. 3, July 1956, R. F. Post, pp. 338, 339, 359, 360, 362.

Atomic Industry Reporter, News and Analysis. Official text, section 1958, Libary No. TK 9001 A7, issue of Jan. 29, 1958, pp. 54:5–54:11.

Proceeds of the Second United Nations International Conference on the Peaceful Uses of Atomic Energy, vol. 32, United Nations, Geneva, 1958.

February 1958, Nucleonics, pp. 90–93, 151–155.

Nuclear Instruments and Methods, vol. 4 (1959), No. 5, pp. 341–345 (by Linhart and Schoch).